March 21, 1950      J. A. MESH      2,501,232
GENERATOR ROTOR
Filed Sept. 14, 1946
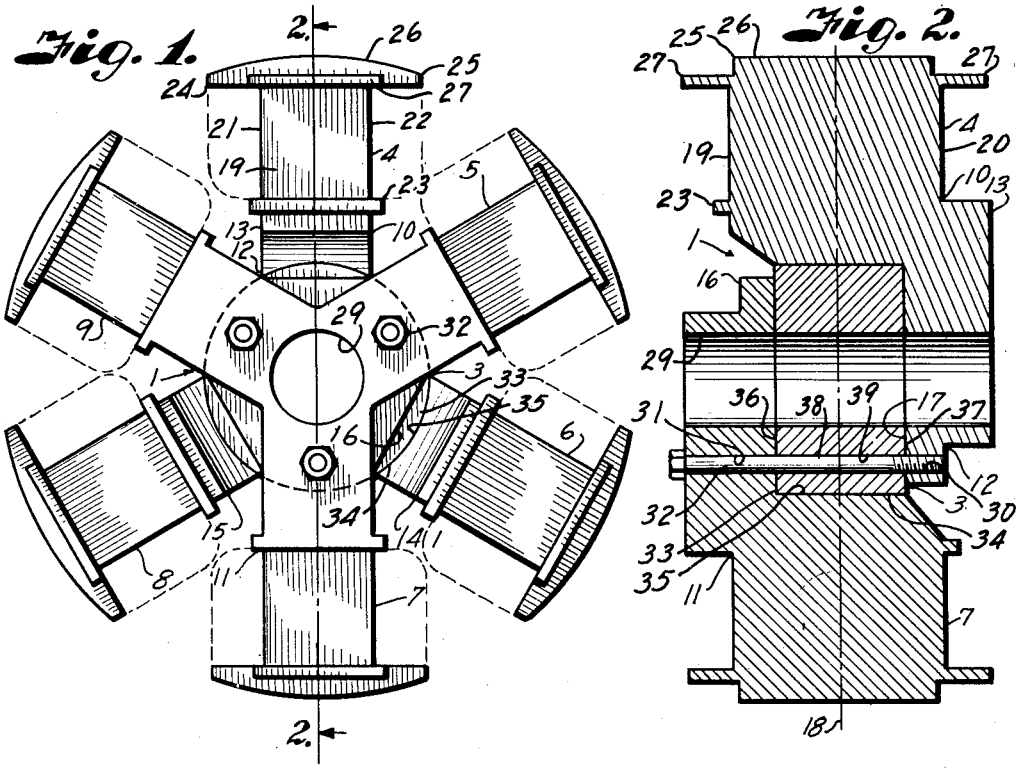
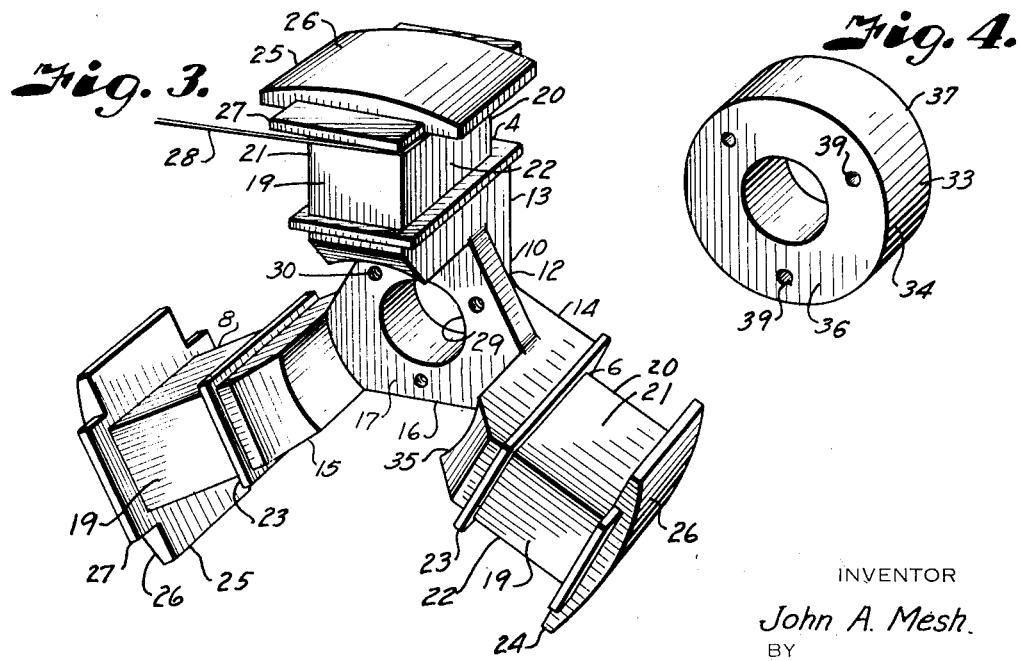
INVENTOR
John A. Mesh
BY
Fishburn & Mullendore
ATTORNEYS

Patented Mar. 21, 1950

2,501,232

UNITED STATES PATENT OFFICE 2,501,232

GENERATOR ROTOR

John A. Mesh, Kansas City, Kans.

Application September 14, 1946, Serial No. 697,096

4 Claims. (Cl. 171—252)

This invention relates to rotators for electric generators or the like, particularly of the revolving pole type wherein coils are wound directly upon the poles. Rotors of this type may be readily wound with the aid of conventional winding machines when they include no more than four poles, but when they include six or more poles, one pole interferes with application of the winding to an adjacent pole, making the construction of such rotors expensive or commercially impractical.

It is, therefore, the purpose of the present invention to provide a rotor having a plurality of poles made up of sections with the poles on the respective sections spaced so that the winding may be carried out on a standard winding machine and to provide a safe and secure interconnection of the sections in a manner which maintains the cross sectional area throughout the path of the magnetic lines of force through the respective pole pieces.

In accomplishing these and other objects of the invention hereinafter pointed out, I have provided improved structure, the preferred form of which is illustrated in the accompanying drawing wherein:

Fig. 1 is a side elevational view of a rotor constructed in accordance with the present invention, the winding being shown in dotted lines.

Fig. 2 is a longitudinal section on the line 2—2 of Fig. 1, particularly illustrating the insert member for maintaining the desired cross sectional area for the magnetic lines of force from one pole to the next.

Fig. 3 is a perspective view of one of the sections particularly illustrating the position of the poles and illustrating the free space about the poles through which the winding is applied to one of the pole pieces without interference of the other pole pieces.

Fig. 4 is a perspective view of the sections connector or insert member.

Referring more in detail to the drawings:

I designates a rotor such as used in an electrical generator and which includes a plurality of poles extending radially from a hub 3 that mounts the rotor on the driven shaft of the generator.

In the illustrated instance the rotor includes six poles 4, 5, 6, 7, 8 and 9 so that it is obvious that when constructed of a single piece, the adjacent poles are in the way of and interfere with the application of winding to the intermediate pole. In order to overcome this difficulty, I have constructed the rotor of sections 10 and 11, the section 10 including the poles 4, 6 and 8 and the section 11 the poles 5, 7 and 9. One of the sections is illustrated in Fig. 3. The sections are identical and the description of one will suffice for the other.

As shown in Fig. 3, a section includes a central web or hub portion 12 having radially extending arms 13, 14 and 15 carrying the poles and which includes a substantially triangular plate-like portion 16 having a flat face 17 from which the radial centers of the poles are offset as indicated by the dot and dash line designated 18 (Fig. 2).

Each pole is of substantially rectangular cross section and has flat side faces 19—20 and 21—22 and projecting from the respective faces are outwardly extending flanges 23 that are spaced inwardly from projecting ends 24 of substantially arcuate-shaped heads 25. The heads 25 have arcuate faces 26 that are adapted to move in substntially close contact with the field pieces of the stator (not shown) but which will be well understood by those skilled in the art of generator structures. The heads also have lateral flanges 27 which with the projecting ends 24 cooperate with the flanges 23 in forming spool-like bodies about which the current conducting wire 28 is coiled for effecting energization of the poles when the rotor is in operation. The hub portion 3 has an axial opening 29 to accommodate the rotor shaft (not shown) and the triangular plate-like portions of one section has threaded openings 30 and the other section has complementary spaced openings 31 to pass fastening devices 32 later described.

In order to key the sections together and provide the desired cross sectional area corresponding to the cross sectional area of the poles, I provide an insert member 33 that is preferably of cylindrical shape to permit ready machining thereof so that the circumferential outer face 34 is snugly received between concave arcuate faces 35 of the rotor sections which faces are machined on the offset portion of the poles concentrically of the shaft openings 29. The member 33 has substantially flat end faces 36 and 37 closely conforming to the faces 17 of the plate-like portions of the respective sections and the member 33 is of a length so that when the parts are assembled it spaces the sections to bring the axial centers of the poles in the same plane of rotation.

In assembling the sections, the connector is inserted between the rotor sections with the poles 4, 6 and 8 located between the poles 9 and 5, 5 and 7, and 7 and 9 respectively. When the sections are thus placed together they are in contact and secured in a radial direction but the fastening devices 32 are necessary to secure the sections in an axial direction.

The fastening devices 32 are preferably cap screws having shanks 38 and are projected through openings 31 of one section and through registering openings 39 of the insert member 33 into the threaded openings 30 of the other section as shown in Fig. 2.

By observing Fig. 2, it will be noted that the cross sectional area through the hub portion of the assembled rotor substantially conforms to the cross section of the respective poles so as to provide the metal necessary to establish the path for the magnetic lines of force evolved when the rotor is installed in a generator.

While I have illustrated and described the invention as pertaining to a six pole rotor, it is to be understood that the invention is applicable to rotors having any number of poles.

From the foregoing it is obvious that I have provided a sectional rotor which permits ready winding of the wire directly upon the poles of the respective sections and that the sections are firmly and securely connected together so that they are not effected by destructive centrifugal forces when the rotor is in operation. It is also obvious that the connection provides the desired cross sectional area throughout the path of the magnetic lines of force.

What I claim and desire to secure by Letters Patent is:

1. A rotor of the character described including a pair of sections, each having three poles equally disposed about the axis of said sections and having hub portions offset from the radial axes of the poles, said poles having concave arcuate faces circumferentially of the axis of the rotor when the sections are in coaxial alignment with the poles of one section in spaces between poles of the other section, a cylindrical member between the hub portions having the cylindrical surface thereof in contact with said concave arcuate faces of the poles for cooperating with said hub portions in forming a path for the magnetic lines of force traveling between said poles when the rotor is in use, and means for securing the said cylindrical member in position between said hub portions.

2. A rotor of the character described including a plurality of sections, each having poles disposed radially about the axes of said sections and having hub portions offset from the radial axes of the poles, said poles having concave arcuate faces circumferentially of the axis of the rotor when the sections are in coaxial alignment with the poles of one section in spaces between poles of another section, a cylindrical member between the hub portions and having the cylindrical surface thereof in contact with said concave arcuate faces of the poles for cooperating with said hub portions in forming a path for the magnetic lines of force traveling between said poles when the rotor is in use, and means for securing said sections and cylindrical member in unitary assembly.

3. A rotor of the character described including interfitting sections of magnetizable material, each section having radially arranged poles uniformly spaced about the axis of rotation of said rotor and having hub portions spaced apart in the longitudinal direction of the rotational axis, an insert member of magnetizable material filling the space between said hub portions of the sections, and means for clamping the hub portions together against the insert member for forming a rigid unitary assembly.

4. A rotor of the character described including a pair of sections, each having poles equally disposed about the axis of said sections and having hub portions offset axially from the radial axes of the poles, said poles having inner faces arranged circumferentially of the axis of the rotor when the sections are in coaxial alignment with the poles of one section in spaces between poles of other sections, an insert member between the hub portions and having an outer surface in direct contact with the inner faces of the poles and having ends in engagement with the facing sides of said hub portions for cooperating with said hub portions in forming a path for magnetic lines of force traveling between said poles when the rotor is in use, and means for securing the hub portions of said sections in engagement with said insert member.

JOHN A. MESH.

REFERENCES CITED

The following references are of record in the file of this patent:

UNITED STATES PATENTS

| Number | Name | Date |
|---|---|---|
| 450,219 | Collins | Apr. 14, 1891 |
| 451,242 | Grant | Apr. 28, 1891 |
| 769,090 | Johnson | Aug. 30, 1904 |
| 1,608,314 | Hibbard | Nov. 23, 1926 |